(12) United States Patent
Pamplona et al.

(10) Patent No.: US 11,110,788 B2
(45) Date of Patent: Sep. 7, 2021

(54) CONTROL STRUCTURE FOR A MOBILE WORK MACHINE, METHOD, AND WORK MACHINE

(71) Applicant: Robert Bosch GmbH, Stuttgart (DE)

(72) Inventors: Alejandro Lopez Pamplona, Empfingen (DE); Nils Steker, Leonberg (DE); Norman Brix, Leipheim (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 16/575,142

(22) Filed: Sep. 18, 2019

(65) Prior Publication Data
US 2020/0094667 A1 Mar. 26, 2020

(30) Foreign Application Priority Data
Sep. 20, 2018 (DE) .................. 10 2018 216 006.6

(51) Int. Cl.
*B60K 6/10* (2006.01)
*E02F 9/22* (2006.01)

(52) U.S. Cl.
CPC .............. *B60K 6/10* (2013.01); *E02F 9/2217* (2013.01)

(58) Field of Classification Search
CPC ........ B60W 30/188; Y02T 10/62; B60K 6/10; E02F 9/2217; F15B 2211/6336
USPC .......................................... 180/165
See application file for complete search history.

(56) References Cited

U.S. PATENT DOCUMENTS

| | | | |
|---|---|---|---|
| 7,008,342 B2* | 3/2006 | Dyck | B60K 6/387 475/5 |
| 9,618,014 B2* | 4/2017 | Morris | F04B 17/05 |
| 9,701,312 B2* | 7/2017 | Jensen | B60W 10/06 |
| 10,017,918 B2* | 7/2018 | Tsukada | F15B 11/02 |
| 10,399,572 B2* | 9/2019 | Meehan | B60K 6/12 |
| 10,408,237 B2* | 9/2019 | Meehan | B66F 9/07572 |
| 2013/0280111 A1* | 10/2013 | Hoxie | F15B 1/02 417/364 |
| 2015/0337877 A1* | 11/2015 | Miyamoto | B60W 20/00 60/327 |

* cited by examiner

*Primary Examiner* — John D Walters
*Assistant Examiner* — Hilary L Johns
(74) *Attorney, Agent, or Firm* — Maginot, Moore & Beck LLP

(57) ABSTRACT

A control structure for a mobile work machine includes at least one output converter, at least one output provider, and a control unit. The at least one output converter is operatively connected to the at least one output provider by way of a shaft, and the control unit determines kinetic energy of the shaft, so as to utilize the shaft as an energy accumulator.

15 Claims, 1 Drawing Sheet

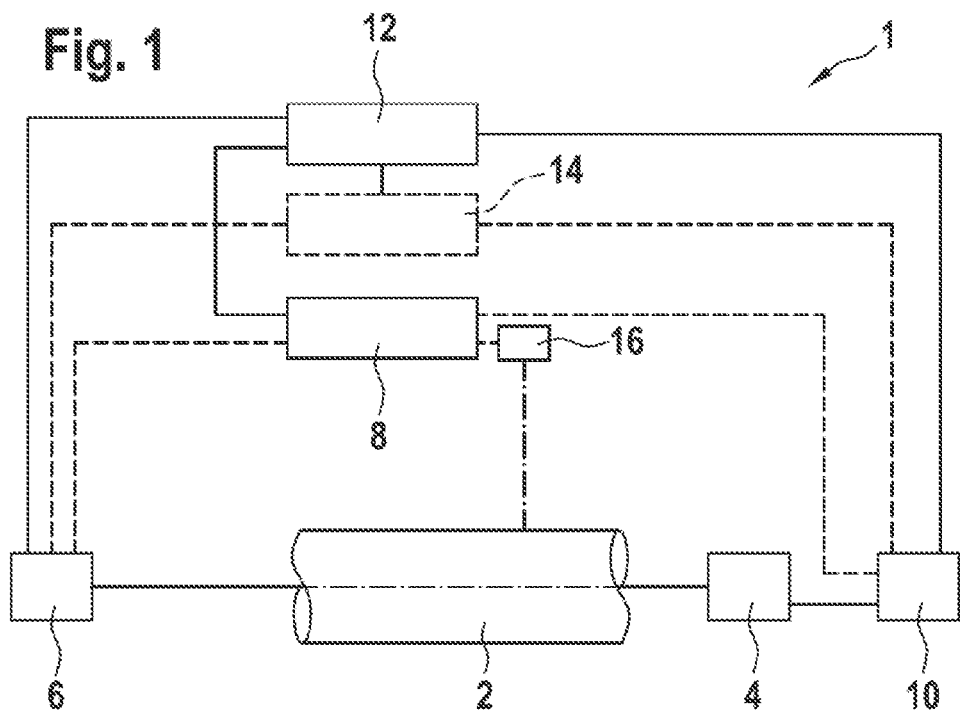
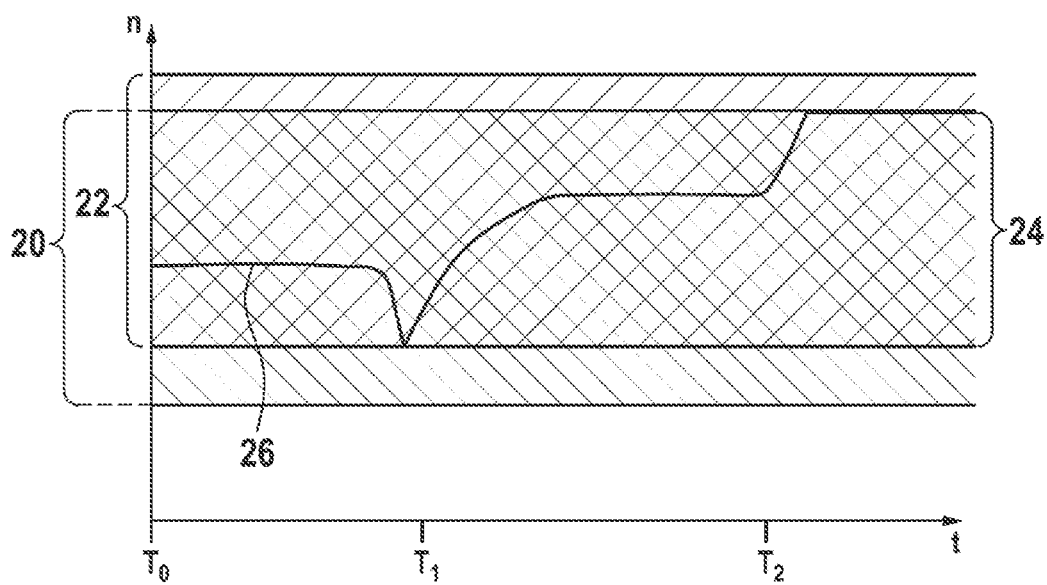

CONTROL STRUCTURE FOR A MOBILE WORK MACHINE, METHOD, AND WORK MACHINE

This application claims priority under 35 U.S.C. § 119 to patent application no. DE 10 2018 216 006.6, filed on Sep. 20, 2018 in Germany, the disclosure of which is incorporated herein by reference in its entirety.

The disclosure relates to a control structure for a mobile work machine. The disclosure furthermore proceeds from a method having said control structure, and to a work machine having said control structure.

BACKGROUND

Mobile work machines are vehicles which, apart from the function of travelling, carry out another working function. A working function can be, for example, sweeping or digging. An internal combustion motor, for example a diesel motor, is in most instances used for driving the work machine. This means that the motor generates the output for the propulsion as well as the output for the working function. The motor drives a crank shaft and/or a motor shaft, and the various output consumers, for example the propulsion drive and/or the working function take off the output from the motor shaft or crank shaft. When a lot of output is required over a short period of time, that is to say when a output peak is present, for example, it can arise that the rotating speed of the crank shaft drops, that is to say that the diesel motor is "squeezed". When the rotating speed of the diesel engine, and thus also the rotating speed of the crank shaft, drops in the event of overloading, more output can be made available to the work machine over a short period of time on account thereof. The reason therefor being that energy is likewise stored in the rotating crank shaft, this being the rotary energy of the shaft which in the event of overloading can be converted to output in order to briefly render the work machine more powerful in order for the work machine to be able cover output peaks. Moreover, the work machine thus has a more agile behavior, that is to say that the work machine can react faster to an increase in output. However, the amount of output, or the amount of energy, respectively, which the shaft can release and/or absorb is undetermined and cannot be taken into account for example in any output calculation.

SUMMARY

It is an object of the disclosure to achieve an efficient control structure for a mobile work machine, said control structure being simple in terms of devices and cost effective. It is moreover a further object of the disclosure to achieve a simple method for controlling a work machine having said control structure, and a work machine having said control structure.

According to the disclosure, a control structure is provided for a work machine, wherein the control structure has at least one output converter, for example a propulsion drive and/or a work hydraulics system and/or power take-off shaft. The control structure furthermore has at least one output provider; this can be an internal combustion motor and/or an electric motor, for example. The output converter takes off the output provided by the output provider by way of a rotatable shaft which is a crankshaft or a motor shaft, for example. In other words, the output provider, for example a diesel motor, drives the shaft such that said shaft rotates, and the output converter is driven by the rotation of the shaft. The control structure furthermore has a control unit. The control unit determines the kinetic energy of the shaft, so as to utilize said shaft as an energy accumulator. In other words, the control unit determines the kinetic energy of the shaft, so as to add said kinetic energy to the output of the motor in the event of an output peak, and on account thereof output peaks can be mitigated in a targeted manner by accelerating or decelerating the shaft.

One advantage of this disclosure is that it is possible on account of the control structure to decelerate the shaft in a targeted manner in the event of a brief increase in the output, and to thus mitigate output peaks without the output provider having an increased consumption, for example without an internal combustion motor having to increase the rotating speed and thus the output discharge in the event of a brief increase in output. This increases the overall efficiency of the work machine since a brief increase in the discharged output of the output provider is thus not required. Furthermore, the output provider can increase the output discharge thereof over a longer period of time should the output converter have an increased output requirement over a longer period of time, and it is not necessary for the output provider to react to an output peak by rapidly increasing the output discharge followed by a rapid output reduction. In other words, on account of the control structure it can be avoided that an increase of the output discharge of the output provider takes place even when only a brief output increased is required by the output converter. Conversely, it is moreover possible for the shaft to accumulate energy in that said shaft rotates faster and thus increases the kinetic energy of said shaft. For example, energy can be accumulated in the shaft in the event of a deceleration of the mobile work machine, and the work machine on account thereof can be decelerated more efficiently, with less wear, and with lower emissions than exclusively by way of a disk brake system, for example. Moreover, the output absorption capability of the output provider, which is an internal combustion motor, for example, can increase on account of an increase in the rotating speed of the shaft since the stationary drag torque increases with the rotating speed. When the work machine is accelerated again thereafter and/or carries out a work function, for example the work function of the work hydraulics system, the energy accumulated in the rotation of the shaft can thus be released and the efficiency of the work machine can thus be increased. This moreover leads to a lower energy consumption of the output provider, and emissions can thus also be reduced. When the output provider is an electric motor, for example, which has an energy accumulator for the supply of energy, it is possible, apart from the energy absorption of the shaft, that energy is accumulated in an energy accumulator by recuperation in the event of a deceleration of the work machine, that is to say when the electric motor is utilized as a generator in the event of a deceleration. This can increase the overall efficiency of the work machine.

The energy E of the shaft is proportional to the square of the rotating speed $n_{ist}$ and moreover a function of the inertia moment J of the shaft. In other words, the kinetic energy E of the shaft is $E = 2 \cdot \Pi^2 \cdot n^2 \cdot J$.

It is preferable for the output provider to drive the shaft within the limits of a rotating speed band. In other words, it is preferable for there to be a minimum shaft rotating speed and the maximum shaft rotating speed at which the output provider can drive the shaft. The minimum shaft rotating speed is particularly advantageous when the output provider is an internal combustion motor since the latter cannot operate below a specific rotating speed and the motor switches off below a specific rotating speed. If the output provider is an electric motor, a minimum shaft rotating speed is not necessary for operating the motor. In other words, the minimum shaft rotating speed in the case of the electric motor can be adapted in such a manner that said minimum shaft rotating speed is a minimum shaft rotating speed required by an output converter, for example. The maximum rotating speed which is chosen in most instances serves for protecting the components. This is also particularly advantageous in the case of an internal combustion motor. Internal combustion motors such as, for example, diesel motors, cannot permanently perform an excessive rotating speed, and damage to the motor can thus be created when the rotating speed is slightly increased and/or heavily increased over a longer period of time. If the output provider is an electric motor, it is thus possible that the maximum rotating speed of the electric motor is not the maximum rotating speed which the work machine in its entirety withstands; that is to say that the maximum rotating speed in the case of a work machine having an electric motor can serve as a protection for the components of the output converter, for example.

The output converter can furthermore likewise have a rotating speed band requirement. This is to say that the output converter requires a rotating speed of the shaft which is within a rotating speed band. In other words, the output provider can drive the shaft within a rotating speed band which is required by the output converter for carrying out a work function. The rotating speed within this rotating speed band is preferably sufficiently fast so that the output converter can absorb sufficient energy for carrying out the work function of said output converter, and the rotating speed of the shaft is preferably sufficiently slow so that the output converter is not damaged by any excessive rotating speed. For example, if the output converter is a work hydraulics system, the minimum rotating speed of the rotating speed band requirement can thus be a rotating speed at which the work hydraulics system can absorb sufficient output, for example, so as to lift an excavator shovel, for example, and the maximum rotating speed can be so high that the work hydraulics system cannot be damaged.

An overlap range can be formed way of the rotating speed band at which the output provider can drive the shaft, and the rotating speed band requirement of the output converter, this thus being a rotating speed band overlap range. If the output provider is a motor, for example, the minimum rotating speed of the rotating speed band overlap range is thus a rotating speed at which the motor does not switch off and the output converter can absorb sufficient output in order to carry out the work function thereof. The maximum rotating speed of the rotating speed band overlap range is preferably a rotating speed at which neither the output provider, or the motor, respectively, nor the output converter is damaged on account of an excessive rotating speed. The rotating speed can thus be chosen within this rotating speed band overlap range so as to carry out a work function, for example.

The rotating speed band overlap range which is determined by the control structure is preferably transmitted to the control unit. The rotating speed band overlap range preferably has at least one minimum rotating speed $n_{min}$ and one maximum rotating speed $n_{max}$. The control unit by way of the rotating speed band overlap range can determine how large the energy absorption potential and/or the energy discharge potential of the shaft are/is. For example, the control unit can calculate the energy potentials by forming a difference between the momentary kinetic energy $E_{ist}$ of the shaft and the maximum or minimum potential energy, $E_{max}$ or $E_{min}$, respectively, of the shaft in the rotating speed band overlap range, thus $E_{pot}=E_{max}-E_{ist}$, or $E_{pot}=E_{ist}-E_{min}$.

The maximum kinetic energy which can be absorbed by the shaft is calculated by the product $E_{max}=2\cdot\Pi^2\cdot n_{min}^2\cdot J$. Accordingly, the minimum kinetic energy, which has the shaft in the rotating speed band overlap range, is $E_{min}=2\cdot\Pi^2\cdot n_{min}^2\cdot J$. The control unit can also calculate the energy potentials in that said control unit forms the difference between the minimum or maximum rotating speed and the currently prevailing rotating speed of the shaft, thus $E_{pot}=2\cdot\Pi^2\cdot n_{diff}^2\cdot J$, wherein $n_{diff}=n_{max}-n_{ist}$, or $n_{diff}=n_{ist}-n_{min}$.

The control unit can preferably derive output potentials of the shaft from the energy potentials. The output absorption and/or discharge of the shaft is larger the faster the energy of the shaft is absorbed or discharged, respectively. In other words, when the energy is added to the shaft or taken off therefrom in a uniform, that is to say linear, manner over a period of time T, the additional output P by virtue of the deceleration of the shaft is calculated using $P=(2\cdot T)^{-1}\cdot J\cdot(2\cdot\Pi(n_{ist}-n_{min}))^2$, and the dynamic thrust output, thus the output that can be absorbed on account of the acceleration of the shaft is calculated using $P=(2\cdot T)^{-1}\cdot J\cdot(2\cdot\Pi(n_{max}-n_{ist}))^2$. This means that the faster the shaft is decelerated and/or accelerated, the higher the output which the shaft absorbs or discharges at this point in time. This means that if a large amount of output is required by an output converter, the shaft can thus be very heavily and/or rapidly decelerated and the output peak can thus be covered.

In one further exemplary design embodiment the control structure has at least two output converters, for example a propulsion drive and a work hydraulics system.

It is furthermore preferable for the control structure to have an output management installation. Said output management installation can in particular be connected to the respective output converters and the output provider, in particular by way of a uniform and/or standardized interface. Uniform and/or standardized output data can be exchanged by way of the interface, for example. The output management installation preferably detects output requirements of the respective output converters and can therefrom calculate an overall output requirement across the entire work machine, for example. Furthermore, the output management installation can control the output discharge of the output provider, for example. The output management installation controls the output discharge of the output provider in particular so as to correspond to the overall output requirement required by the output converters. In other words, the output management installation can determine the output requirements of the respective output converters, can require the output from the output provider so as to correspond to the output requirements, and preferably likewise influence the output absorption of the various output converters.

It is furthermore possible for the output management installation to limit the output absorption of individual output converters, for example when the overall output requirement of the output receivers is higher than the maximum output discharge of the output provider and the output potential of the shaft. In other words, it is particularly advantageous when the energy discharge potentials and the energy absorption potentials, or the output absorption potentials and/or output discharge potentials, respectively, of the shaft are additionally known to the output management installation so that said potentials can be taken into account in the overall calculation of the output management installation. This means that the energy which is contained in the rotation of the shaft and the energy absorption potential and/or energy discharge potential of the shaft resulting therefrom can be included in the output management installation in the calculation of the overall output of the machine typology as an additional output provider and/or an additional output converter, that is to say an additional output source and/or an additional output sink.

In one exemplary embodiment the control unit which calculates the energy potentials and/or the output potentials can be part of the output management installation. This is advantageous since the output management installation thus handles the entire output calculation and/or energy calculation and an additional control unit or computing unit, respectively, is thus not required.

The control unit can moreover be part of a motor control unit of the output provider. In other words, the output provider has a motor control unit which controls, for example, the injected quantity of fuel and/or the timing cycle is in the case of an internal combustion motor. This is advantageous since the motor control unit knows the rotating speed of the shaft since said motor control unit controls the rotating speed of the motor. This means that the rotating speed has to be determined, for example by measurement, for example by a further sensor, but can be directly retrieved from the motor control unit.

In one further potential design embodiment the control unit can be connectable to the output management installation by way of a uniform standardized interface. In other words, the control unit, as also an output converter and/or the output provider, for example, can possess the uniformly standardized interface and by way of the latter can communicate energy potentials and/or output potentials of the shaft to the output management installation. In other words, at least part of the output converter, for example the propulsion drive, the work hydraulics system, and/or the air control unit, for example, can communicate the output absorption potential thereof to the output provider, and the output provider communicates the output discharge potential thereof the output management installation. The control unit can likewise reflect the output discharge potential and/or the output absorption potential of the shaft to the output management installation. The output management installation in turn can combine the output absorption potentials as well as the output discharge potentials so as to form an overall output and can accordingly control the output discharge and/or the output absorption of various output converters and/or output providers and/or of the shaft.

It is furthermore advantageous for the control structure to have a rotating speed management installation. The rotating speed management installation can manage, for example, the rotating speed band requirements of the respective output converters or of the output converter said rotating speed band requirements being communicated to the rotating speed management installation by the respective output converter or the output converter. The rotating speed band of the output provider can preferably be known to the rotating speed management installation. The rotating speed management installation can calculate a rotating speed band overlap from the respective rotating speed band requirements and the rotating speed band of the output provider, and the rotating speed management installation can transmit said rotating speed band overlap to the output management installation and/or to the control structure and/or to the motor control unit of the output provider and/or to another component of the control structure. Like the output management installation, the rotating speed management installation can also have a uniform standardized interface by way of which said rotating speed management installation is connected to the output management installation and/or to the control unit and/or to at least part of the output converters or to the output converter or the motor control unit of the output provider. On account of the rotating speed management installation it is possible for different components, such as for example the output provider and/or different output converters or the output converter be able to be replaced without many modifications having to be performed. When a component is replaced, said component can thus transmit the rotating speed band requirement thereof simply to the rotating speed management installation, for example, and a calculation of the rotating speed band overlap thus continues to be possible.

The controlling of the work machine by way of the control structure which has at least one output converter and/or at least the output provider which are operatively connected by the at least one rotatable shaft can be a method which comprises the following steps. The kinetic energy of the shaft is first determined by the control unit. In other words, the control unit can determine the kinetic energy of the shaft from the rotating speed which is, for example, transmitted and/or communicated by the motor control unit and/or a sensor system. Thereafter the rotating speed band overlap is determined, for example by the control unit and/or by the rotating speed management installation and/or by the output management installation and/or buy the motor control unit and/or by another component of the control structure. The rotating speed band overlap is the overlap of the rotating speed band requirement of the output provider or output providers and of the rotating speed band of the output provider. In other words, a rotating speed band which has a minimum rotating speed as well as a maximum rotating speed is determined. The energy absorption potential and/or the energy discharge potential of the shaft can then be determined from the difference between the nominal rotating speed and the minimum or maximum rotating speed of the rotating speed band overlap. A further possibility lies in calculating the maximum kinetic energy and/or the minimum kinetic energy which can be absorbed by the shaft and in calculating the energy absorption potential and/or the energy discharge potential from the difference between the momentary kinetic energy and the maximum and/or the minimum kinetic energy of the shaft.

BRIEF DESCRIPTION OF THE DRAWINGS

A preferred exemplary embodiment of the disclosure will be explained in more detail hereunder by means of schematic drawings in which:

FIG. 1 shows a schematic illustration of a control structure for a mobile work machine according to one exemplary embodiment; and FIG. 2 shows a diagram which shows the rotating speed of a shaft over time.

DETAILED DESCRIPTION

FIG. 1 shows a control structure 1 having a shaft 2 which is driven by an output provider 4. Furthermore, an output converter 6 is connected to the shaft 2, said output converter 6 being able to absorb output as well as discharge output to the shaft 2 and thus being able to accelerate or decelerate the rotation of the shaft 2. The output converter 6 can be, for example, a propulsion drive and require energy for acceleration and thus decelerate the shaft 2, and/or the output converter 6 can discharge output to the shaft 2 in the event of a deceleration of the mobile work machine.

The control structure 1 furthermore has a control unit 8 which calculates how much kinetic energy is contained by the shaft 2 and how an energy absorption potential and/or an energy discharge potential of the shaft 2 is within the limits of a rotating speed band overlap. The rotating speed band overlap can be determined by an overlap of a rotating speed band requirement of the output converter 6 and of the rotating speed band at which the output provider 4 can drive the shaft 2. Furthermore, a motor control unit 10 which can control an internal combustion process of the output provider 4 is provided on the output provider 4. Said motor control unit 10, as also the output converter 6, can be connected to an output management installation 12. Said output management installation 12 can manage output absorption potentials of the output converter 6 and/or of the shaft 2 and/or the output discharge potentials of the output provider 4 and/or of the shaft 2. The output management installation 12 is connected to the control unit 8 so as to control the output absorption potential and/the output discharge potential of the shaft 2. The control unit 8 can also be part of the output management installation 12.

The control structure 1 furthermore has a rotating speed management installation 14. Said rotating speed management installation 14 can determine the rotating speed band overlaps, for example. To this end, said rotating speed management installation 14 is connected to the output converter 6 as well as to the motor control unit 10. The rotating speed management installation 14 is connected to the control unit 8 so as to communicate the rotating speed band overlap of the output converter 6 and of the output provider 4 to the control unit 8. If the rotating speed management installation 14 is not contained in the control structure 1, the control unit 8 per se can determine the rotating speed band overlap; to this end, the control unit 8 can be connected to the output converter 6, for example, so that said output converter 6 communicates the rotating speed band requirement to the control unit 8. Furthermore, the rotating speed band of the output provider 4 can be known to the control unit 8. In order to determine the momentary rotating speed, the control unit 8 can furthermore be connected to the motor control unit 10, and said motor control unit 10 can communicate the momentary rotating speed to the control unit 8. The control structure 1 can furthermore have a sensor system 16 which measures the rotation of the shaft 2 and transmits this information to the control unit 8. In other words, there are various possibilities pertaining to how the control unit 8 can be integrated in the control structure 1.

Summarizing, the control unit 8 can either receive a rotating speed band overlap by way of the rotating speed management installation 14 and/or the control unit 8 per se can determine the momentary rotating speed by way of a sensor system 16 and/or by way of the motor control unit 10 and thus determine the rotating speed band overlap. Furthermore summarizing, the control unit 8 can transmit the energy potentials to the output management installation 12 and/or the control unit 8 can be part of the output management control installation 12 and the output management installation can control the rotating speed of the shaft 2 so as to correspond to the energy potentials and/or output potentials.

A diagram is illustrated in FIG. 2. Said diagram shows the rotating speed n of the shaft 2 from FIG. 1 over time t. Various rotating speed bands are illustrated in the diagram. A rotating speed band 20 describes the rotating speed band in which an output provider 4 can drive the shaft 2. A rotating speed band 22 describes the rotating speed band requirement of an output converter 6. A rotating speed band overlap range 24 is furthermore illustrated. A rotating speed 26 of the shaft 2 should be within the rotating speed band overlap range 24.

An exemplary profile of the rotating speed 26 is illustrated in the diagram. From the time point $T_0$ to the time point $T_1$ the output converter 6, cf. FIG. 1, can require a constant output from the output provider 4, in particular by way of the output management installation 12, for example. At the time point $T_1$ the output converter 6 increases the output requirement thereof. The work machine is accelerated, for example. The energy which is accumulated in the shaft can be released so as to rapidly react to the output requirement. To this end, the rotating speed 26 which is constant up to the time point T1 drops down to the minimum rotating speed of the rotating speed band overlap range 24. This means that the maximum possible kinetic energy is released. The size of the corresponding output which has been transmitted to the output converter 6 by decelerating the shaft 2 depends on the time during which the shaft 2 has been decelerated. The rotating speed of the output provider 4 is thereafter regulated by motor control unit 10, for example, and the rotating speed 26 is increased. In the case of an internal combustion motor, this can be controlled by increasing the injected quantity, for example. Thereafter, a constant higher output than in the time period from $T_0$ to $T_1$ is demanded by the output converter. The output converter 6 discharges energy to the shaft 2 at the time point $T_2$, this meaning that the rotation of the shaft 2 and thus the rotating speed 26 is increased. This can arise in the event of a deceleration of the work machine, for example. This means that energy is absorbed by the shaft 2 by rotation.

Disclosed is a control structure for a mobile work machine, wherein the control structure has at least one output converter, at least one output provider, and a control unit. The output converter is operatively connected to the output provider by way of a shaft, and the control unit determines the kinetic energy of the shaft, so as to utilize said shaft as an energy accumulator.

| List of reference signs | |
|---|---|
| 1 | Control structure |
| 2 | Shaft |
| 4 | Output provider |
| 6 | Output converter |
| 8 | Control unit |
| 10 | Motor control unit |
| 12 | Output management installation |
| 14 | Rotation speed management installation |
| 16 | Sensor system |
| 20, 22 | Rotating speed band |
| 24 | Rotating speed overlap range |
| 26 | Rotating speed profile |
| n | Rotating speed |
| t | Time |

What is claimed is:

1. A control structure for a mobile work machine, comprising:
   at least one output converter;
   at least one output provider;
   at least one rotatable shaft configured to operatively connect the at least one output provider to the at least one output converter, the at least one rotatable shaft configured as an energy accumulator; and
   a control unit configured to determine a kinetic energy of the at least one rotatable shaft.

2. The control structure according to claim 1, wherein:
the at least one output provider is configured to drive the at least one rotatable shaft within limits of a rotating speed band defined by a lower speed limit and an upper speed limit.

3. The control structure according to claim 2, wherein the at least one output converter has a rotating speed band requirement.

4. The control structure according to claim 3, wherein the control unit is configured to determine a rotating speed band overlap range as an overlap of the rotating speed band of the at least one output provider and of the rotating speed band requirement of the at least one output converter.

5. The control structure according to claim 4, wherein the control unit is configured to determine a size of an energy absorption potential and/or an energy discharge potential of the at least one rotatable shaft on account of a variation of a rotating speed within the limits of the rotating speed band overlap range or of the rotating speed band.

6. The control structure according to claim 1, wherein the control unit is configured to determine an output absorption potential and/or an output discharge potential of the at least one rotatable shaft.

7. The control structure according to claim 1, further comprising an output management installation.

8. The control structure according to claim 1, wherein the at least one output converter includes at least two output converters.

9. The control structure according to claim 7, wherein the output management installation is configured to control respective output absorption of the at least one output converter and/or an output discharge of the at least one output provider.

10. The control structure according to claim 7, wherein the control unit is included in the output management installation.

11. The control structure according to claim 7, wherein the control unit is connectable to the output management installation by way of a uniform and/or standardized interface.

12. The control structure according to claim 1, further comprising:
a rotating speed management device configured to detect respective or rotating speed requirements of the at least one output converter.

13. The control structure according to claim 1, wherein the control structure is included in a work machine.

14. A method for controlling a work machine having a control structure, the method comprising:
determining a kinetic energy of at least one rotatable shaft with a control unit of the control structure; and
utilizing the at least one rotatable shaft as an energy accumulator,
wherein the control structure includes at least one output converter, at least one output provider, the at least one rotatable shaft, and the control unit, and
wherein the at least one output provider, for transmitting output, is operatively connected to the at least one output converter by way of the at least one rotatable shaft.

15. The method for controlling the work machine according to claim 14, further comprising:
determining a rotating speed band overlap range which is an overlap of a rotating speed requirement of the at least one output converter and of a rotating speed band of the at least one output provider; and/or
determining an energy absorption potential and/or an energy discharge potential of the at least one rotating shaft in the rotating speed band overlap range and/or in the rotating speed band.

* * * * *